UNITED STATES PATENT OFFICE.

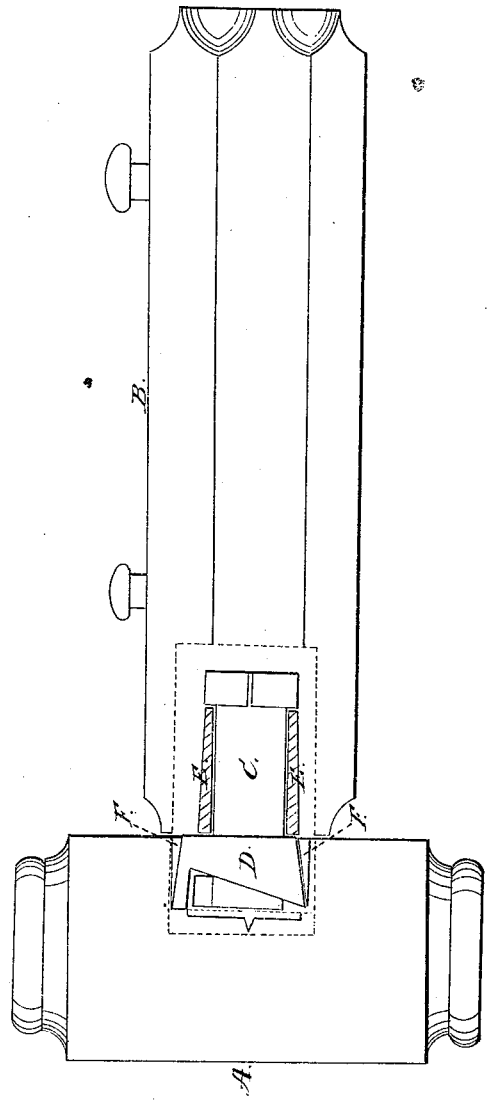
*E. G. Hopkins,*
*Bedstead Fastening*
N° 26,104. Patented Nov. 15 1859.
Witnesses:
Thomas J. Baker
Charles Ketchum
Inventor:
Elisha G Hopkins

ELISHA G. HOPKINS, OF PENN YAN, NEW YORK.

BEDSTEAD-FASTENING.

Specification of Letters Patent No. 26,104, dated November 15, 1859.

*To all whom it may concern:*

Be it known that I, ELISHA G. HOPKINS, of Penn Yan, in the county of Yates and State of New York, have invented a new and Improved Bedstead-Fastening; and I do hereby declare that the following is a full, clear, and exact description of the construction and operation of the same, reference being had to the accompanying drawing, making a part of this specification, in which the figure represents a section of a post and a rail, with a portion of each removed, as shown by the dotted lines, to show the fastenings in their places.

A is the post of the ordinary construction. It has a hole bored in it to receive the ring and it is as deep as the length of the ring. The hole is bored with a smaller auger three eighths of an inch deeper to receive the end of the bolt C. A mortise is made at one side of the hole to receive the projection on the side of the ring.

B, is the rail. It may be made round or square with the ends true so as to make a tight joint at its connection with the post. A hole is made in each end the size of the large end of the bolt C.

C, is a bolt the same diameter as the hole through the ring D. The end that enters the rail is made larger for the purpose of keeping it firm in the rail by means of the wedge E E, and on the largest portion is one or more ribs that project so as to be driven into the wood when the bolt is driven into the rail. The use is to prevent the bolt being turned in the rail. At the other end of the bolt is a key shaped projection which is made to pass through the ring and it serves as catch or key to hold the parts together when the rail is turned to the right or left. The action of this projection on the oblique end of the ring draws the post and rail firmly together.

D is an oblique conical shaped ring with a hole the size of the bolt and with a mortise at one side of the hole to receive the projection of the bolt. It is made with a projection on the shortest side of the ring. This projection and the length of the short side are equal to the long side. This projection may be extended around or any distance preferred. The use of this projection is to keep the ring in proper position while being fastened to the post.

E E, is a wedge made to fill the space around the bolt that is between the head of the bolt and end of the rail. The wedge must be secured to the rail with nails or otherwise, but glue is preferable. The wedge must be even with ends of the rail so that when force is applied that would draw the wedge out, the end of the wedge comes in contact with the ring D and is thereby prevented from being drawn out by any force that would be exerted in the ordinary use of the bedstead.

F F, is a wedge fitted to the space between the ring D and wood of the post A. It must be driven firmly and secured with glue. Its use is to prevent the ring being drawn from the post. It must be made even with the surface of the post so that when force is applied that would tend to draw it from the post it will come in contact with the end of the rail and thereby be prevented from being withdrawn and when properly made and put together the force that tightens the bedstead has no influence to loosen or draw out the ring.

To use my invention bore the holes as specified, insert and secure the irons as directed then put the bedstead together and turn the rails outward or inward as you choose and the bedstead will be firmly fastened together. If a cord is used apply it to the pins on the rails and apply as much force as you please to tighten the cord or put as much weight as you please upon the bed and there will be no risk of pulling out the rings or bolts, for force thus applied has no tendency to pull them out.

What I claim as my invention and desire to secure by Letters Patent is—

The construction and arrangement of the parts C, D, E and F substantially as specified and for the purpose set forth.

ELISHA G. HOPKINS.

Witnesses:
THOMAS T. BAKER,
CHARLES KETCHUM.